(12) United States Patent
Milojicic et al.

(10) Patent No.: US 10,540,286 B2
(45) Date of Patent: Jan. 21, 2020

(54) SYSTEMS AND METHODS FOR DYNAMICALLY MODIFYING COHERENCE DOMAINS

(71) Applicant: Hewlett Packard Enterprise Development LP, Houston, TX (US)

(72) Inventors: Dejan S Milojicic, Palo Alto, CA (US); Keith Packard, Portland, OR (US); Michael S. Woodacre, Winchester (GB); Andrew R Wheeler, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/967,596

(22) Filed: Apr. 30, 2018

(65) Prior Publication Data

US 2019/0332538 A1    Oct. 31, 2019

(51) Int. Cl.
*G06F 12/08*    (2016.01)
*G06F 12/0837*    (2016.01)

(52) U.S. Cl.
CPC .. *G06F 12/0837* (2013.01); *G06F 2212/1032* (2013.01); *G06F 2212/62* (2013.01)

(58) Field of Classification Search
CPC ............. G06F 12/0815; G06F 12/0833; G06F 12/0837
USPC ........................................................ 711/141
See application file for complete search history.

(56) References Cited

U.S. PATENT DOCUMENTS

| | | | |
|---|---|---|---|
| 6,510,496 B1 | 1/2003 | Tarui et al. | |
| 7,484,043 B2 | 1/2009 | Heller, Jr. et al. | |
| 7,743,375 B2 | 6/2010 | Goodman et al. | |
| 8,612,691 B2 | 12/2013 | Speight et al. | |
| 2001/0052054 A1* | 12/2001 | Franke | G06F 12/0806 711/147 |
| 2009/0182893 A1 | 1/2009 | Anand et al. | |
| 2010/0146209 A1 | 6/2010 | Burger et al. | |

(Continued)

OTHER PUBLICATIONS

Dubnicki, C. et al.; "Adjustable Block Size Coherent Caches"; 1992; 11 pages.

(Continued)

*Primary Examiner* — Than Nguyen
(74) *Attorney, Agent, or Firm* — Sheppard Mullin Richter & Hampton LLP (57) ABSTRACT

Systems and methods for dynamically modifying coherence domains are discussed herein. In various embodiments, a hardware controller may be provided that is configured to automatically recognize application behavior and dynamically reconfigure coherence domains in hardware and software to tradeoff performance for reliability and scalability. Modifying the coherence domains may comprise repartitioning the system based on cache coherence independently of one or more software layers of the system. Memory-driven algorithms may be invoked to determine one or more dynamic coherence domain operations to implement. In some embodiments, declarative policy statements may be received from a user via one or more interfaces associated with the controller. The controller may be configured to dynamically adjust cache coherence policy based on the declarative policy statements received from the user.

23 Claims, 7 Drawing Sheets

(56) References Cited

U.S. PATENT DOCUMENTS

2012/0265944 A1* 10/2012 Speight .............. G06F 12/0831
  711/146

OTHER PUBLICATIONS

Fu, Y. et al.; "Coherence Domain Restriction on Large Scale Systems"; Dec. 5-9, 2015; 13 pages.

* cited by examiner

SYSTEMS AND METHODS FOR DYNAMICALLY MODIFYING COHERENCE DOMAINS

TECHNICAL FIELD

The disclosed technology relates generally to computing system resource configuration, and more particularly, dynamically and programmatically adjusting coherence domains in a multiple-cache multiprocessor system.

DESCRIPTION OF THE RELATED ART

With the introduction of new computer processing, memory, and interconnect technologies, computing systems are frequently growing in size. Shared-memory multiprocessor systems with operating memories of tens of terabytes are common, and these systems will soon scale up to and beyond memories of petabytes. These large memories require multiple cache coherence domains because caching across large memory devices is neither scalable nor practical. Therefore, systems are typically partitioned into parts with hardware cache coherence, software cache coherence, or even no coherence at all.

BRIEF SUMMARY OF EMBODIMENTS

The systems and methods described herein may dynamically and programmatically adjust coherence domains in a multiprocessor system. In various embodiments, the systems and methods described herein may involve a hardware controller configured to dynamically modify cache coherence domains.

In various implementations, the hardware controller described herein may be configured to automatically recognize application behavior and dynamically reconfigure coherence domains in hardware and software to tradeoff performance for reliability and scalability. Modifying the coherence domains may comprise repartitioning the system based on cache coherence independently of one or more software layers of the system. In various implementations, modifications to coherence domains may be performed in an application-specific manner, at the virtualization layer, and/or at the middleware layer. In some embodiments, the software layers may cooperate to achieve further benefits of repartitioning by including software-coherent partitions.

In various embodiments, the systems and methods described herein may perform one or more dynamic operations on coherence domains using one or more memory-driven algorithms. In some embodiments, cache traffic may be continuously monitored and one or more memory-driven algorithms may be utilized to determine operations on the coherence domains that would optimize overall performance of the system. In some embodiments, declarative policy statements may be received from a user via one or more interfaces associated with the controller. The controller may be configured to dynamically adjust cache coherence policy based on the declarative policy statements received from the user.

The system may include one or more hardware processors configured by machine-readable instructions. Executing the machine-readable instructions may cause the one or more processors to dynamically modify cache coherence domains and/or dynamically adjust cache coherence policy based on declarative policy statements received from a user. In various embodiments, the one or more physical processors may be physically located within a hardware controller of the system. The one or more physical processors may represent processing functionality of multiple components of the system operating in coordination. Therefore, the various processing functionality described in relation to the one or more processors may be performed by a single component or by multiple components of the system.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for dynamically modifying cache coherence domains. In shared-memory multiprocessor systems with separate memory caches for each processor, cache coherence ensures that changes to cached data do not result in conflicting data stored in the shared memory. A cache coherence policy refers to a protocol that is used to maintain cache coherence. In large-scale computing systems that may include a large quantity of nodes (e.g., numbering in the thousands), cache coherence may be restricted to subsets of the systems nodes—or cache coherence domains. A system controller may be provided to dynamically modify cache coherence domains and/or dynamically adjust cache coherence policy based on declarative policy statements received from a user.

Figure 1:
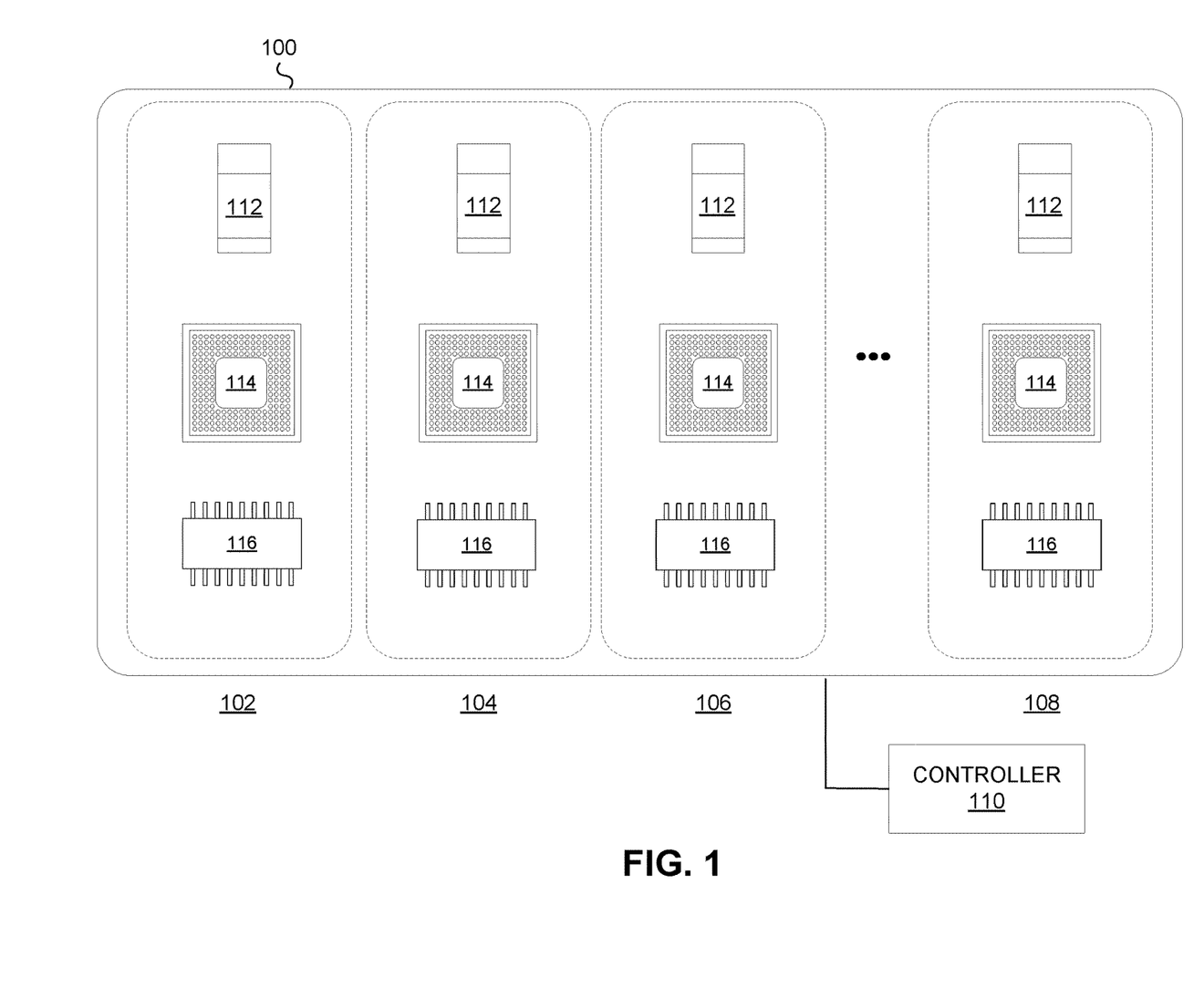
FIG. 1 depicts a block diagram of an example computing system divided into multiple partitions, each including a set of hardware components, in accordance with various embodiments.

FIG. 1 depicts a block diagram of an example computing system 100 divided into multiple partitions, each including a set of hardware components, in accordance with various embodiments. For example, the partitions may include partitions 102, 104, 106, 108, or any other quantity of partitions. Each partition may comprise a hardware environment operative to execute one or more operations of computing system 100. An operation may comprise an application, a program, and/or other computer operation executed partly or entirely by the environment of a single partition.

The hardware environment for each partition may comprise multiple hardware components configured to execute the one or more operations of computer system 100. For example, each partition may include one or more accelerators (identified in FIG. 1 as 112), one or more CPUs (identified in FIG. 1 as 114), one or more memory modules (identified in FIG. 1 as 116), and may include one or more other hardware components.

Figure 2:
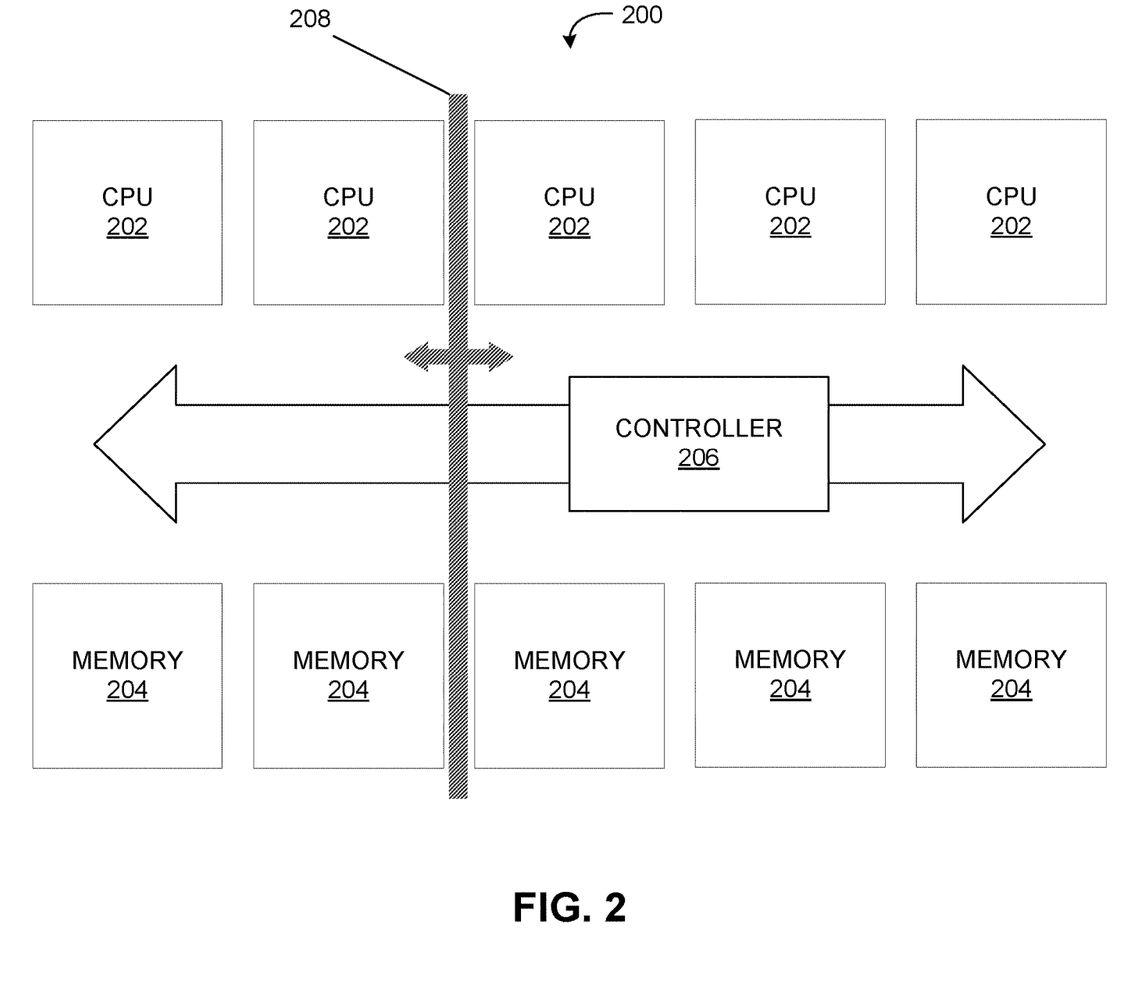
FIG. 2 provides another depiction of an example computing system including a hardware controller configured to dynamically reconfigure cache coherence domains, in accordance with various embodiments.

FIG. 2 provides another depiction of an example computing system 200 in accordance with various embodiments. This example computing system 200 includes a number of hardware elements within the computing environment, including computing resources 202 (depicted here as CPUs 202) and memory elements 204. The computing resources 202 can include any of a number of different types of computing resources including, for example, CPUs or other general processing units, GPUs or other special processing units, and other processing resources. In various embodiments, the hardware elements depicted in computing system 200 may be interconnected by a fabric that provides configurable interconnects between the various elements of the computing system 200. In this example, there are 5 instances of each of CPUs 202 and memory elements 204. However, in various applications there may be any quantity of each of these resources. Indeed, in large-scale computing systems there may be thousands of computing nodes distributed across a number of racks or even across a number of data centers, each with one or more CPUs 202 and memory elements 204.

The example computing system 200 of FIG. 2 depicts various hardware elements partitioned into two coherency domains. For example, a first coherence domain includes two computing resources 202 and two memory elements 204, and a second coherence domain includes three computing resources 204 and three memory elements 204, as shown divided in Figured 2 by barrier 208.

The example computing system 200 of FIG. 2 also includes a controller 206. Controller 206 may comprise a hardware controller in a rack scale system. In various embodiments, controller 206 may be configured to reconfigure (or modify) cache coherence domains of computing system 200 by growing or shrinking domains (e.g., by adding or removing hardware elements) using interconnect functions. For example, the controller may be configured to reconfigure cache coherence domains by assigning additional memory or computing resources to a domain and/or reassigning memory or computing resources from one domain to a different domain. In some embodiments, the controller may maintain coherence domain information that maps cache coherence domains. For example, the coherence domain information may map applications, programs, or other virtual elements to hardware resources within a computing system (e.g., computing system 200), and maps applications, programs, and/or other virtual elements, as well as individual hardware resources, to individual cache coherence domains. In an exemplary embodiment, a controller may reassign all or a portion of a memory element from a first domain to a second domain, and cause the first domain to transfer information stored on the memory element to a different memory element based on the coherence domain information. In various embodiments, controller 206 may be configured to programmatically and/or dynamically modify coherence domains in computing system 200.

Computing system 200 depicted in FIG. 2 may comprise a plurality of partitions (similar to partitions 102, 104, 106, 108 depicted in FIG. 1). Each partition may comprise a hardware environment including a set of hardware components. The hardware environment of each partition may be operative to execute one or more operations of computing system 200. In various embodiments, the hardware environment of each partition may be executing at least one application and be associated with one of a set of cache coherence domains. In various embodiments, the hardware environment for multiple partitions may each be associated with a single cache coherence domain. For example, multiple partitions may each be associated with one of the two coherence domains depicted in FIG. 2. In various embodiments, controller 206 may be configured to reconfigure the set of cache coherence domains while one or more of the partitions is executing at least one application. As such, controller 206 may be configured to dynamically reconfigure (modify) coherence domains in computing system 200 without requiring a reboot.

In various embodiments, a controller described herein may be configured to dynamically adjust cache coherence policy in a multi-cache environment. For example, the controller may be configured to implement automatic cache coherence policy adjustments that adapt in real-time to memory system activity. A user may supply guidance to the automatic cache coherence policy implementation to control performance, scaling, and failure management effects of cache coherence policy changes.

In various embodiments, controller 206 may include one or more interfaces configured to invoke changes to coherence domains. For example, on top of controller 206, one or more interfaces may be defined that directly control cache coherence policy. In some embodiments, controller 206 may be configured to obtain and maintain a cache coherence policy for computing system 200. For example, controller 206 may be configured to obtain and maintain a cache coherence policy for a plurality of partitions of computing system 200. In various embodiments, controller 206 may be configured to receive user input indicating one or more modifications to the cache coherence policy and automatically modify the cache coherence policy (and/or the cache coherence domains) based on the user input. In some embodiments, controller 206 may be configured to implement modifications to the cache coherence policy based on user input while one or more partitions are executing at least one application. For example, a cache coherence policy may refer to protocols that are used to maintain cache coherence and/or cache coherence domains. The protocol may indicate one or more domain parameters (e.g., maximum or minimum size of memory on a domain, maximum or minimum number of resources on a domain, and/or one or more other domain parameters), one or more requirements for maintaining cache coherence (e.g., write propagation, transaction serialization, and/or one or more other requirements), one or more methods for maintaining cache coherence, and/or other protocols for maintaining cache coherence and/or cache coherence domains within a computing system. In an exemplary embodiment, a controller may configured to receive user input indicating one or more modifications to cache coherence policy. For example, the user input may indicate one or more modifications related to the minimum amount of available memory on a domain. Based on the user input, the controller may be configured to, through one or more upcalls to other layers of the computing system, implement the modifications to the cache coherence policy, as described further herein with respect to FIG. 5. For example, based on stored coherence domain information, the controller may be configured to identify one or more domains that fall below a minimum amount of memory available on a domain. Based on the user input and the determination that one or more domains fall below the minimum amount of memory available on the domain, the controller may be configured to reconfigure the identified one or more domains to make more memory available. For example, the controller may be configured to grow the identified cache coherence domain by assigning additional memory resources to those domains and/or by reassigning memory resources from other domains to the one or more identified domains.

In various embodiments, controller 206 may be configured to monitor cache traffic involving a set of cache coherence domains of computing system 200. Based on the cache traffic for the set of cache coherence domains of computing system 200, controller 206 may be configured to automatically modify the set of cache coherence domains. For example, if controller 206 determines that there is substantial traffic in one part of the system that is not cache coherent, it may decide to change the coherency boundaries. In an exemplary embodiment, a controller described herein may be configured to identify cache coherence domains based on coherence domain information. The coherence domain information may map cache coherence domains to applications, programs, and/or other virtual elements and corresponding hardware resources within a computing system. In various embodiments, a controller described herein (e.g., controller 206) may identify traffic that is between cache coherence domains based on monitored traffic and coherence domain information. For example, to identify traffic that is between cache coherence domains, the controller may be configured to identify traffic between components on different domains and determine whether the components are included within a single cache coherence domain based on the coherence domain information.

Based on identified traffic between cache coherence domains, the controller may be configured to determine one or more operations to improve performance within the computing system. For example, the controller may be configured to modify coherency boundaries in order to move traffic between components on separate domains to a single cache coherence domain. The controller may be configured to modify coherency boundaries by forming a coherence domain, merging coherence domains, or splitting a coherence domain. For example, in order to modify coherency boundaries to move traffic between components on separate domains to a single cache coherence domain, the controller may be configured to automatically grow or shrink a cache coherence domain by assigning additional memory or computing resources to a domain and/or reassigning memory or computing resources from one domain to a different domain. By modifying the boundaries of cache coherence domains to move traffic between components on separate domains to a single cache coherence domain, cached data that may have been stored in multiple memory elements may remain coherent while also facilitating access to additional cached data related to components in frequent communication. In some embodiments, controller 206 may be configured to reconfigure coherence domains in hardware and software to tradeoff performance for reliability and scalability.

In various embodiments, controller 206 may be configured to monitor one or more parameters and/or conditions of computing system 200. Based on the one or more parameters and/or conditions of computing system 200, controller 206 may be configured to automatically modify the set of cache coherence domains. For example, controller 206 may be configured to monitor service-level agreements (SLAB) and/or monitor for failures. If certain parameters are detected and/or one or more conditions are met, controller 206 may be configured to automatically reconfigure coherence domains of computing system 200.

In various embodiments, controller 206 may be configured to perform one or more cache management operations. For example, before or after reconfiguring cache coherence domains, controller 206 may be configured to erase or remove all data from a cache related to a reconfigured cache coherence domain. For example, reconfiguring one or more cache coherence domains may involve growing or shrinking a domain by adding or removing memory resources associated with at least one domain. Each time cached data is written to a system memory device, the cached data is flushed (erased or removed from the cache) in order to make cache space available for other data. Similarly, each time a memory resource is moved from one domain to another, cached data on that memory resource from an application no longer within the same domain must be removed to make cache space available for other data. In some implementations, a server may act as a broker for a coherent region that is being modified. For example, the removed data from a cache may be temporarily stored on a server before being stored in a cache or written to a system memory device.

In some embodiments, controller 206 may be configured to reconfigure coherence domains in conjunction with support from an operating system to perform reconfiguration transparently to applications running on computing system 200. For example, controller 206 may be configured to invoke operating system upcalls in order to perform coherence domain reconfiguration. In various embodiments, upcalls from a controller described herein may be utilized to reconfigure cache coherence domains. For example, upcalls from the controller to one or more operating systems may comprise a notification or instruction from the controller to the operating system. Each operating system may interface with one or more other operating systems to synchronize operations performed on cache coherence domains. In some embodiments, the one or more operating systems may communicate with one or more applications executing on the respective operating systems to provide an indication of reconfigurations to a respective cache coherence domain.

In some embodiments, coherence domains may be reconfigured in an application-specific manner. For example, each application executed on computing system 200 may monitor cache traffic and perform application specific reconfiguration of the coherence domains. In some embodiments, an application may instruct controller 206 to perform one or more operations on one or more coherence domains related to the application. In some embodiments, coherence domains may be reconfigured at the virtualization layer. For example, coherence domains may be reconfigured at a layer comprising either virtual machines or containers, transparently to the application and to the hardware. In some embodiments, coherence domains may be reconfigured at the middleware level.

Figure 3:
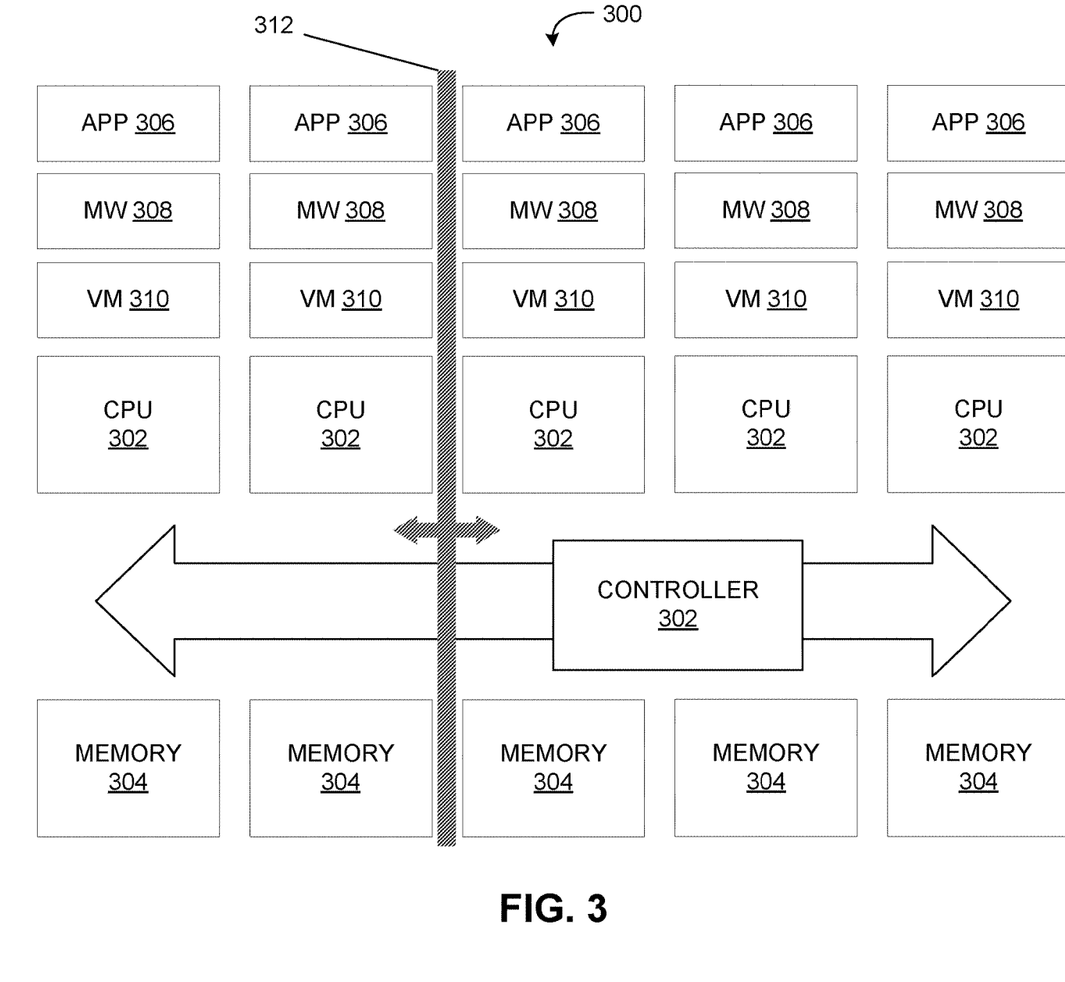
FIG. 3 depicts an example of a computing system, including different levels at which coherence domain reconfiguration may be implemented, in accordance with various embodiments.

FIG. 3 depicts an example of a computing system 300, including different levels at which coherence domain reconfiguration may be implemented, in accordance with various embodiments. This example computing system 300 includes a controller 302 and a number of hardware elements, including computing resources 302 (depicted here as CPUs 302) and memory elements 304. Computing system 300 also depicts a virtualization layer (depicted by virtualization layer components 310), a middleware layer (depicted by middleware layer components 308), and an application layer (depicted by application layer components 306). In some embodiments, coherence domain reconfiguration may be implemented by an autonomic agent running in controller 302. In some embodiments, coherence domain reconfiguration may be implemented as application-specific reconfiguration. In some embodiments, coherence domain reconfiguration may be implemented as middleware-level reconfiguration. In some embodiments, coherence domain reconfiguration may be implemented as virtualization-level reconfiguration.

In various embodiments, one or more memory-driven algorithms may be utilized to determine one or more dynamic operations on coherence domains to implement in hardware and software to tradeoff performance for reliability and scalability. In various embodiments, a controller described herein may be configured to implement one or more dynamic operations on coherence domains determined by the memory-driven algorithms. Memory-driven algorithms may enable dynamic operations on the coherence domains as islands in the overall hardware architecture. In some embodiments, cache traffic may be continuously monitored and, after a warm-up period, used by the memory-driven algorithms to determine one or more dynamic operations to implement on coherence domains of a system that would optimize overall performance of the system. For example, a dynamic coherence domain operation may comprise forming a coherence domain, merging coherence domains, or splitting a coherence domain. Invoking memory-driven algorithms to determine one or more dynamic coherence domain operations to implement may involve hierarchical tracking between layers of the computing system. In some embodiments, the memory-driven algorithms, as described herein, may determine one or more coherence domain operations to implement based on cache traffic. A hardware controller described herein may be configured to execute one or more coherence domain operations determined by the memory-driven algorithms. In some embodiments, the memory-driven algorithms may observe application behavior (e.g., by monitoring application behavior metrics) and determine one or more coherence domain operations to implement based on the observed application behavior.

Figure 4:
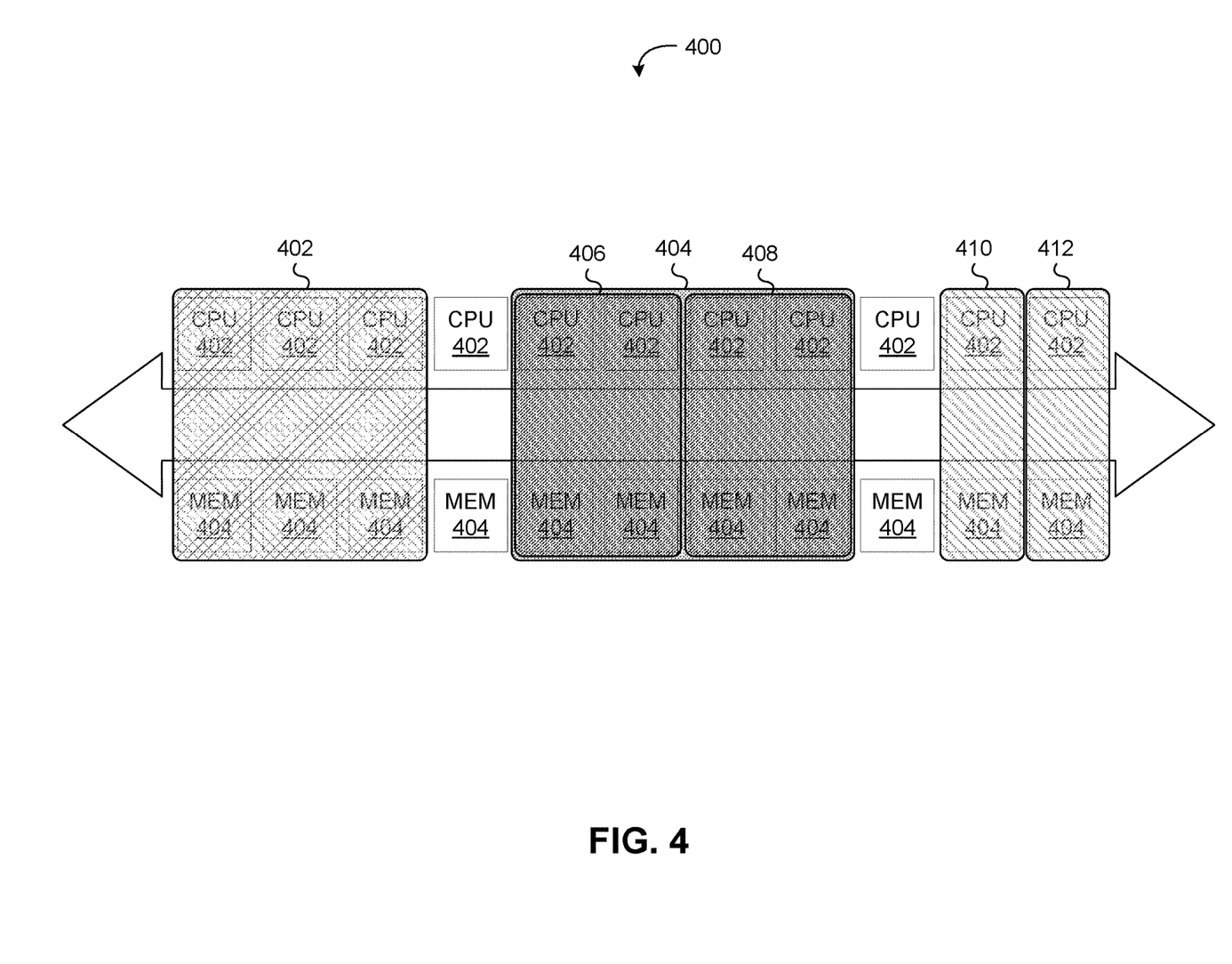
FIG. 4 depicts an example of one or more coherence domain operations that may be performed in a shared-memory multiprocessor system, in accordance with various embodiments.

FIG. 4 depicts an example of one or more coherence domain operations that may be performed in a shared-memory multiprocessor system, in accordance with various embodiments. In some embodiments, reconfiguring coherence domains by implementing a dynamic coherence domain operation may comprise forming a coherence domain, as depicted by coherence domain 402. In some embodiments, reconfiguring coherence domains by implementing a dynamic coherence domain operation may comprise merging coherence domains. For example, a coherence domain 406 may be merged with a coherence domain 408 to create merged coherence domain 404. In some embodiments, reconfiguring coherence domains by implementing a dynamic coherence domain operation may comprise splitting a coherence domain, as depicted by split coherence domain 410 and coherence domain 412.

In some embodiments, modifications to cache coherence domains may be effectuated by one or more servers that may act as brokers for coherent regions to be modified. For example, one or more servers may act as brokers for coherent regions that need to grow or shrink. A server or arbiter may be configured to determine one or more coherence domain operations to implement. In some embodiments, requests to or from the one or more servers may be enabled via one or more application programming interfaces (APIs).

In some embodiments, one or more applications may determine one or more coherence domain operations to implement. For example, one or more applications may determine, peer-to-peer, that one more coherence domains are to grow or shrink based on application behavior metrics measured by the individual applications. Behavior metrics may include cache metrics, local and remote latency histograms, number of outstanding requests, fabric backpressure, and/or other measurements of traffic patterns involving one or more applications. Behavior metrics may be improved through cache coherence operations because accessing cached data is faster than accessing underlying storage devices. Similarly, the use of a cache allows for higher throughput from the underlying resource, by assembling multiple fine grain transfers into larger, more efficient requests. As such, if data required by an application is located in a cache, the application will not need to access an underlying storage device, which benefits both measured latency and bandwidth.

In some embodiments, one or more applications may trigger one or more coherence domain operations based on application behavior metrics measured by the individual applications. For example, the one or more applications may compare the behavior metrics to one or more thresholds or boundaries to determine whether to implement one or more coherence domain operations. In an exemplary embodiment, an application may trigger a coherence domain operation by comparing cache metrics indicating a percentage or number of cache hits or a number of outstanding requests to predefined threshold for a percentage or number of cache hits and a number of outstanding requests, respectively. The application may determine that the number of outstanding requests exceeds a threshold. As a result, the application may determine that increasing available cache space for the application would improve the number of outstanding requests and trigger a coherence domain operation to make additional cache space available to the application. Based on an instruction from an application to the controller, the controller may be configured to grow or shrink a cache coherence domain associated with that application in order to make more cache space available to that application.

In various embodiments, a controller described herein may interface with one or more layers within the computing system. In some embodiments, the controller may interface with an interconnect level, a virtualization layer, a middleware layer, an application layer, and/or one or more other layers or levels of a computing system. For example, the controller may interface with an interconnect level to monitor traffic within the system (e.g., cache traffic). In various embodiments, multiple layers of a computing system may cooperate to determine one or more dynamic coherence domain operations to implement and/or reconfigure the coherence domains. In various embodiments, the multiple layers may utilize upcalls initiated from a controller described herein.

Figure 5:
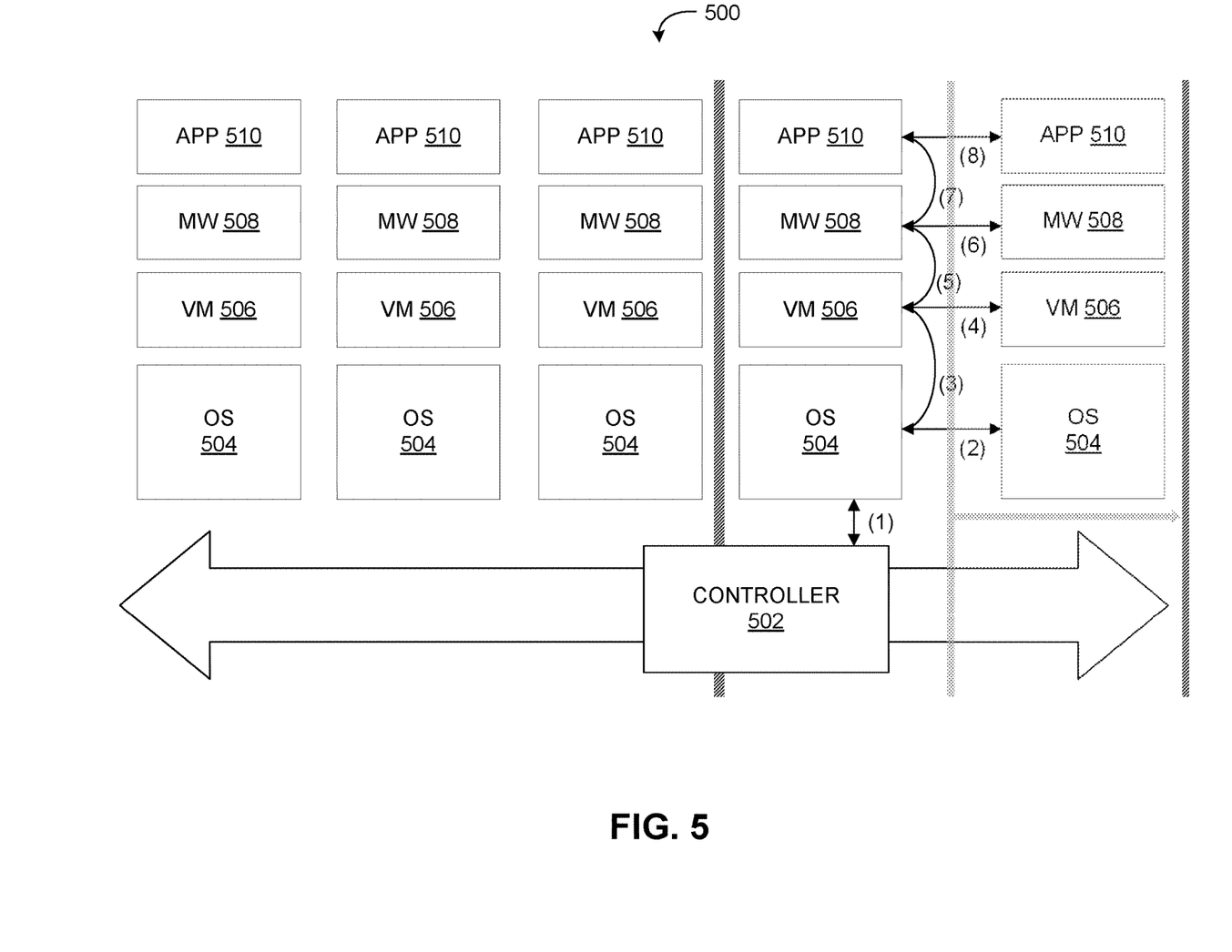
FIG. 5 depicts an example computing system in which cooperative elastic layers may work together to enable dynamic operations on coherence domains, in accordance with various embodiments.

For example, FIG. 5 depicts an example computing system 500 in which cooperative elastic layers may work together to enable dynamic operations on coherence domains, in accordance with various embodiments. In various embodiments, a controller described herein may operate within a computing system comprising multiple operating systems, and multiple components operating at each of an virtualization layer, a middleware layer, and/or an application layer. In FIG. 5, computing system 500 may comprise a virtualization layer depicted by virtualization layer components 506, a middleware layer depicted by middleware layer components 508, and/or an application layer depicted by applications 510.

In various embodiments, upcalls from a controller described herein may be utilized to reconfigure cache coherence domains. In some embodiments, upcalls from the controller may be utilized to execute operations on cache coherence domains determined by one or more memory-driven algorithms. For example, in FIG. 5, the upcalls may be initiated by a first upcall 1 from controller 502. Upcall 1 from controller 502 may comprise a notification or instruction from controller 502 to operating system 504. Operating system 504 may interface with one or more other operating systems to synchronize operations performed on cache coherence domains. In FIG. 5, this communication may be indicated by call 2 from one operating system 504 to another operating system 504. In some embodiments, one or more operating systems 504 may synchronize cache coherence operations between the operating system(s) 504 and a virtualization layer via an upcall from an operating system 504 to the virtualization layer—depicted in FIG. 5 as upcall 3 from operating system 504 to virtualization layer component 506. Operations may be synchronized across the virtualization layer via communication between components at the virtualization layer—depicted in FIG. 5 as call 4 from one virtualization layer component 506 to another virtualization layer component 506. In some embodiments, operations may be synchronized between the virtualization layer and a middleware layer via an upcall from the virtualization layer to the middleware layer. For example, in FIG. 5, this upcall is depicted as upcall 5 from virtualization layer component 506 to middleware layer component 508. Operations may be synchronized across the middleware layer via communication between components at the middleware layer—depicted in FIG. 5 as call 6 from one middleware layer component 508 to another middleware layer component 508. In some embodiments, operations may be synchronized between the middleware layer and one or more applications via an upcall from the middleware layer to the one or more applications. For example, in FIG. 5, this upcall is depicted as upcall 7 from middleware layer component 508 to application 510. Operations may be synchronized across applications via communication between applications—depicted in FIG. 5 as call 8 from one application 510 to another application 510.

In some embodiments, underlying layers may hide policies from higher layers. For example, an operating system may hide the cache coherence policy changes from applications successfully. In some embodiments, this may be achieved by page-table management across the systems where page "ownership" would migrate between systems, and page faults would drive cache flushing. A page table may comprise a data structure that maps virtual addresses to physical addresses. Page tables enable memory available to a given application to be segmented across different areas of physical memory without affecting the applications ability to access the memory. When an application accesses data in memory, the page table may be used to locate the data in physical memory. If when an application requests data in memory, a fault is detected, the system may be configured to flush the cache associated with the application (or write the cached data associated with that application to a system memory device).

Various features described herein are described as being performed by one or more hardware processors configured by machine-readable, computer program instructions. Executing the instructions may cause the one or more processors to dynamically and programmatically adjust coherence domains in a multiple-cache multiprocessor system. In various embodiments, the one or more physical processors may be physically located within a hardware controller of a computing system. In various embodiments, some or all of the features described herein may be performed by a controller of a computing system. In various embodiments, a controller described herein may be configured to automatically perform the one or more functions described herein. In some embodiments, some or all of the features described herein may be performed by one or more other processors that are configured to execute the features described herein by machine-readable instructions.

Figure 6:
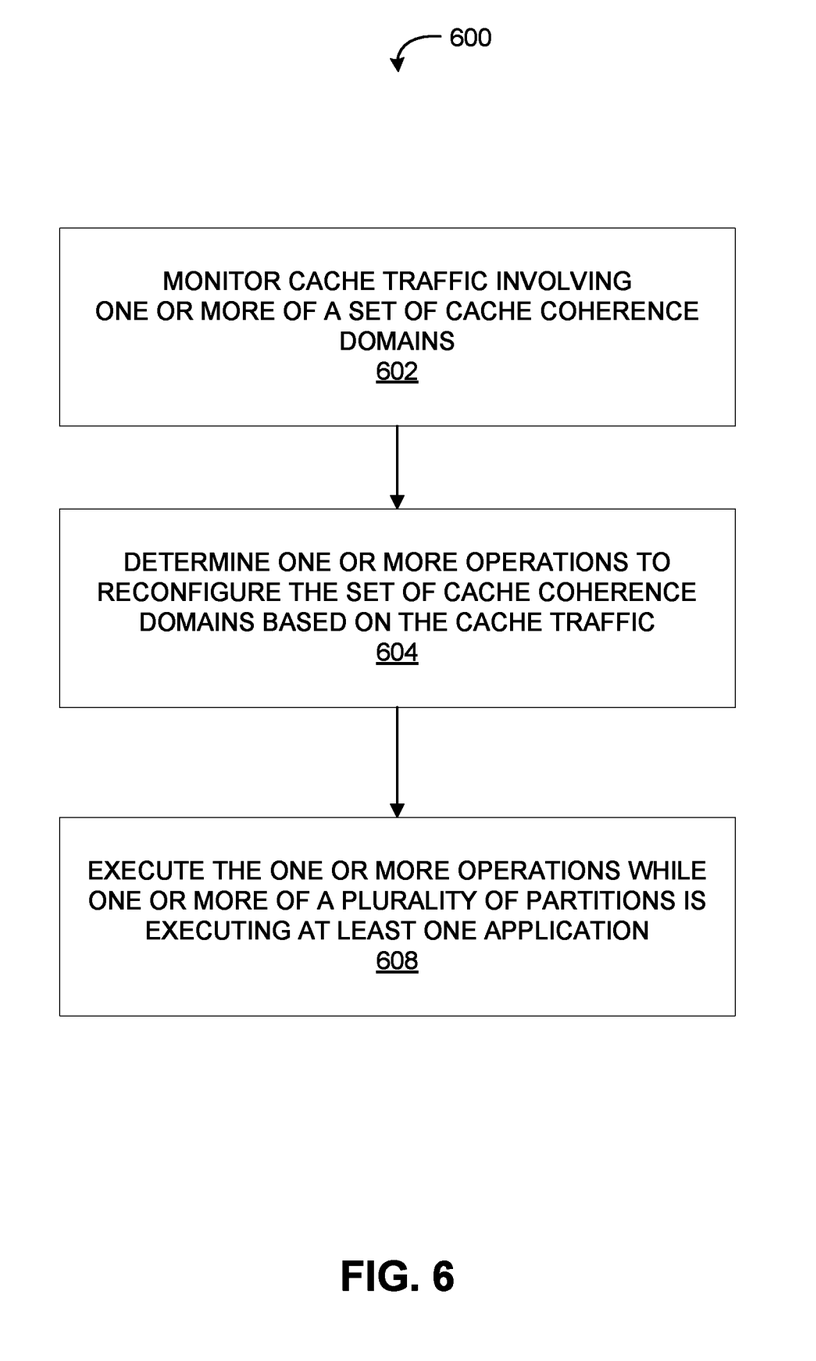
FIG. 6 is an example of a method for dynamically modifying cache coherence domains, in accordance with various embodiments.

FIG. 6 is an example of a method 600 for dynamically modifying cache coherence domains, in accordance with various embodiments. The operations of method 600 presented below are intended to be illustrative and, as such, should not be viewed as limiting. In some implementations, method 600 may be accomplished with one or more additional operations not described, and/or without one or more of the operations discussed. In some implementations, two or more of the operations may occur substantially simultaneously. The described operations may be accomplished using some or all of the system components described in detail above.

In some embodiments, method 600 may be implemented in one or more processing devices (e.g., a digital processor, an analog processor, a digital circuit designed to process information, a central processing unit, a graphics processing unit, a controller, a microcontroller, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

In an operation 602, method 600 may include monitoring cache traffic involving one or more of the set of cache coherence domains. In some embodiments, the cache traffic may be monitored in order to evaluate one or more parameters or conditions associated with a computing system. For example, service-level agreements (SLAB) or failures may be monitored based on cache traffic involving the set of cache coherent domains.

In an operation 604, method 600 may include determining one or more operations to reconfigure the set of cache coherence domains based on the cache traffic. In various embodiments, one or more memory-driven algorithms may be utilized to determine one or more dynamic operations to implement on coherence domains. Memory-driven algorithms may enable dynamic operations on the coherence domains as islands in the overall hardware architecture. In some embodiments, cache traffic may be continuously monitored and, after a warm-up period, used by the memory-driven algorithms to determine one or more dynamic operations to implement on coherence domains of a system that would optimize overall performance of the system. Invoking memory-driven algorithms to determine one or more dynamic coherence domain operations to implement may involve hierarchical tracking between layers of the computing system.

In an operation 608, method 600 may include executing the one or more operations while one or more partitions of the set of cache coherence domains is executing at least one application. For example, a dynamic coherence domain operation may comprise forming a coherence domain, merging coherence domains, or splitting a coherence domain.

Figure 7:
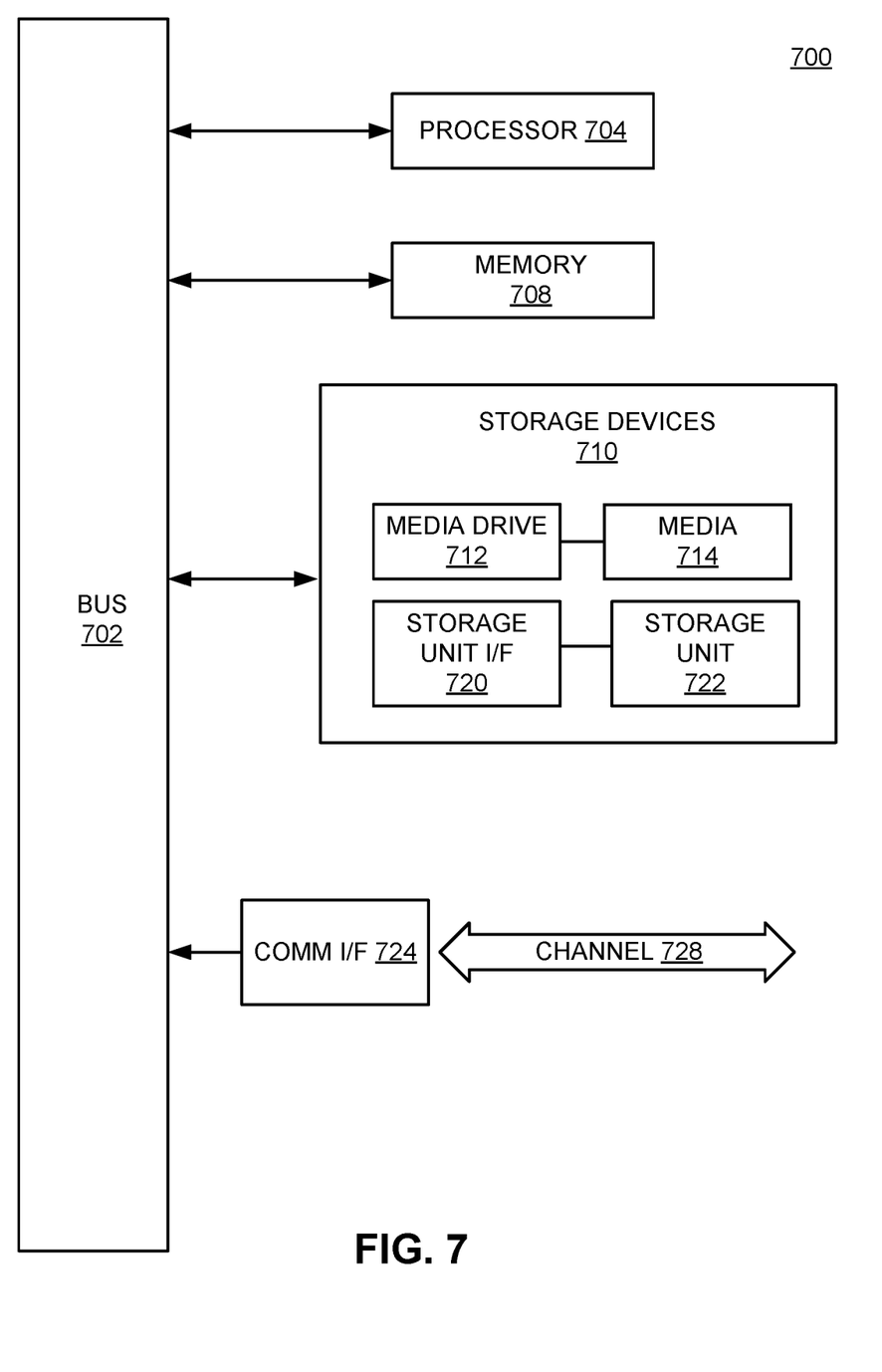
FIG. 7 illustrates an example computing module that may be used in implementing various features of embodiments of the disclosed technology.

As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where modules are implemented in whole or in part using software, in one embodiment, these software elements can be implemented to operate with a computing or processing system capable of carrying out the functionality described with respect thereto. One such example computing system is shown in FIG. 7. Various embodiments are described in terms of this example-computing system 700. After reading this description, it will become apparent to a person skilled in the relevant art how to implement the technology using other computing systems or architectures.

Referring now to FIG. 7, computing system 700 may represent computing or processing capabilities within a large-scale system comprising a plurality of hardware components of various types that may communicate within and across partitions. Computing system 700 may also represent, for example, computing or processing capabilities found within mainframes, supercomputers, workstations or servers; or any other type or group of special-purpose or general-purpose computing devices as may be desirable or appropriate for a given application or environment. Computing system 700 might also represent computing capabilities embedded within or otherwise available to a given device.

Computing system 700 might include, for example, one or more processors, controllers, control modules, or other processing devices, such as a processor 704. Processor 704 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 704 is connected to a bus 702, although any communication medium can be used to facilitate interaction with other components of computing system 700 or to communicate externally.

Computing system 700 might also include one or more memory modules, simply referred to herein as main memory 708. For example, in some embodiments random access memory (RAM) or other dynamic memory, might be used for storing information and instructions to be executed by processor 704. Main memory 708 might also be used for storing temporary variables or other intermediate information during execution of instructions to be executed by processor 704. Computing system 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), a flash drive, or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing system 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a flash drive and associated slot (for example, a USB drive), a PCMCIA slot and card, and other fixed or removable storage units 722 and interfaces 720 that allow software and data to be transferred from the storage unit 722 to computing system 700.

Computing system 700 might also include a communications interface 724. Communications interface 724 might be used to allow software and data to be transferred between computing system 700 and external devices. Examples of communications interface 724 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to accomplish the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for dynamically modifying coherence domains, the system comprising:
   a plurality of partitions, wherein each of one or more of the plurality of partitions is executing at least one application and is associated with one of a set of cache coherence domains; and
   a controller configured to:
      reconfigure the set of cache coherence domains while one or more of the plurality of partitions is executing at least one application;
      obtain a cache coherence policy for one or more of the plurality of partitions;
      receive user input indicating one or more modifications to the cache coherence policy; and
      responsive to the user input, implement the modifications to the cache coherence policy based on the user input while one or more of the plurality of partitions is executing at least one application.

2. The system of claim 1, wherein the controller is further configured to:
   monitor cache traffic involving one or more of the set of cache coherence domains; and
   automatically modify the set of cache coherence domains based on the cache traffic.

3. The system of claim 1, wherein to reconfigure the set of cache coherence domains, the controller is further configured to:
   grow or shrink individual cache coherence domains of the set of cache coherence domains.

4. The system of claim 3, wherein to grow or shrink the individual cache coherence domains, the controller is further configured to:
   assign available memory to at least one of the individual cache coherence domains.

5. The system of claim 3, wherein to grow or shrink the individual cache coherence domains, the controller is further configured to:
   reassign at least one memory or computing resource from a first domain of the individual cache coherence domain to a second domain of the individual cache coherence domains.

6. The system of claim 5, wherein the controller is further configured to:
> flush a cache associated with the at least one memory or computing resource prior to reassigning the at least one memory or computing resource to the second domain.

7. The system of claim 1, wherein to reconfigure the set of cache coherence domains, the controller is further configured to:
> determine one or more operations related to the set of cache coherence domains based on one or more memory-driven algorithms and the cache traffic, wherein to reconfigure the set of cache coherence domains, the controller is configured to execute the one or more operations.

8. The system of claim 7, wherein the controller is further configured to:
> transmit an upcall to synchronize the reconfigured set of cache coherence domains across multiple layers of the system.

9. The system of claim 1, wherein the controller is further configured to:
> receive instructions from one or more applications executed on the plurality of partitions, wherein the one or more applications are configured to monitor behavior metrics for the one or more applications and determine one or more operations to implement based on the behavior metrics, wherein the controller is configured to reconfigure the set of cache coherence domains based on the one or more operations determined by the one or more applications.

10. The system of claim 9, wherein the one or more application behavior metrics comprise one or more of cache metrics, local and remote latency histograms, number of outstanding requests, and fabric backpressure.

11. A method for dynamically modifying coherence domains in a system comprising a plurality of partitions, wherein each of one or more of the plurality of partitions is executing at least one application and is associated with one of a set of cache coherence domains, the method comprising:
> monitoring cache traffic involving one or more of the set of cache coherence domains;
> determining one or more operations to reconfigure the set of cache coherence domains based on one or more memory-driven algorithms and the cache traffic;
> executing the one or more operations while one or more of the plurality of partitions is executing at least one application;
> obtaining a cache coherence policy for one or more of the plurality of partitions;
> receiving user input indicating one or more modifications to the cache coherence policy; and
> responsive to the user input, implementing the modifications to the cache coherence policy based on the user input while one or more of the plurality of partitions is executing at least one application.

12. The method of claim 11, wherein the one or more operations are executed by a controller.

13. The method of claim 11, the method further comprising:
> automatically executing the one or more operations to reconfigure the set of cache coherence domains based on the cache traffic.

14. The method of claim 11, wherein executing the one or more operations comprises:
> growing or shrinking individual cache coherence domains of the set of cache coherence domains.

15. The method of claim 14, wherein growing or shrinking the individual cache coherence domains comprises:
> assigning available memory to at least one of the individual cache coherence domains.

16. The method of claim 14, wherein growing or shrinking the individual cache coherence domains comprises:
> reassigning at least one memory or computing resource from a first domain of the individual cache coherence domain to a second domain of the individual cache coherence domains.

17. The method of claim 16, the method further comprising:
> flushing a cache associated with the at least one memory or computing resource prior to reassigning the at least one memory or computing resource to the second domain.

18. The method of claim 11, the method further comprising:
> transmitting an upcall to synchronize the reconfigured set of cache coherence domains across multiple layers of the system.

19. A hardware controller configured to dynamically modify coherence domains in a system comprising a plurality of partitions, wherein each of one or more of the plurality of partitions is executing at least one application and is associated with one of a set of cache coherence domains, the controller comprising:
> one or more physical processors programmed by computer program instructions that, when executed by the one or more physical processors, configure the controller to:
>> monitor cache traffic involving one or more of the set of cache coherence domains; and
>> reconfigure the set of cache coherence domains while one or more of the plurality of partitions is executing at least one application;
>> obtain a cache coherence policy for one or more of the plurality of partitions;
>> receive user input indicating one or more modifications to the cache coherence policy; and
>> responsive to the user input, implement the modifications to the cache coherence policy based on the user input while one or more of the plurality of partitions is executing at least one application.

20. The controller of claim 19, wherein to reconfigure the set of cache coherence domains, the controller is further configured to:
> grow or shrink individual cache coherence domains of the set of cache coherence domains.

21. The controller of claim 19, wherein the controller is further configured to:
> determine one or more operations related to the set of cache coherence domains based on one or more memory-driven algorithms and the cache traffic, wherein to modify the set of cache coherence domains, the controller is configured to execute the one or more operations.

22. The controller of claim 19, wherein the controller is further configured to:
> receive instructions from one or more applications executed on the plurality of partitions, wherein the one or more applications are configured to monitor behavior metrics for the one or more applications and determine one or more operations to implement based on the behavior metrics, wherein the controller is configured to reconfigure the set of cache coherence domains based on the one or more operations determined by the one or more applications.

23. The controller of claim 19, wherein the controller is further configured to:

transmit an upcall to synchronize the reconfigured set of cache coherence domains across multiple layers of the system.

* * * * *